United States Patent [19]

Boisset

[11] Patent Number: 5,330,245
[45] Date of Patent: Jul. 19, 1994

[54] MOVABLE VEHICLE SEAT

[75] Inventor: Bernard Boisset, Etampes, France

[73] Assignee: Bertrand Faure Automobile "BFA", Massy, France

[21] Appl. No.: 987,716

[22] Filed: Dec. 9, 1992

[30] Foreign Application Priority Data

Dec. 12, 1991 [FR] France .................. 91 15442

[51] Int. Cl.$^5$ ............................................. B60N 2/02
[52] U.S. Cl. ................................ 296/65.1; 292/304
[58] Field of Search .................... 296/63, 65.1;
248/503.1; 403/323, 103; 29/453; 292/304,
DIG. 39, DIG. 14, DIG. 43

[56] References Cited

U.S. PATENT DOCUMENTS

| 429,352 | 6/1890 | Lombard et al. | 248/503.1 |
|---|---|---|---|
| 660,651 | 10/1900 | Olmsted | 248/503.1 |
| 2,034,971 | 3/1936 | Brockway | 292/DIG. 14 X |
| 2,793,061 | 5/1957 | Dall | 292/DIG. 14 X |
| 3,088,765 | 5/1963 | Krause | 292/DIG. 14 X |
| 3,749,434 | 7/1973 | Gley | 292/DIG. 14 X |
| 4,822,092 | 4/1989 | Sweers | 296/63 |
| 4,865,377 | 9/1989 | Musser et al. | 248/503.1 X |
| 4,869,541 | 9/1989 | Wainwright | 296/65.1 |
| 4,971,379 | 11/1990 | Rumpel et al. | 296/63 |

Primary Examiner—David M. Mitchell
Assistant Examiner—Gary C. Hoge
Attorney, Agent, or Firm—Larson and Taylor

[57] ABSTRACT

A movable seat for a vehicle, the seat being of the type including an unlockable fixing mechanism for connecting its seat structure to the floor of the vehicle. The mechanism includes a latch 8 having a shoulder 9 and mounted to move relative to the structure 2, the latch being suitable for penetrating in an opening 3 in the floor 1. Under the control of control mechanism, the latch 8 can take up either an unlocking position in which it is capable of penetrating into the opening 3 or of escaping therefrom, or else a locking position after it has penetrated into the opening, in which locking position the shoulder 9 is in locking engagement beneath an edge 3' of the opening 3.

11 Claims, 4 Drawing Sheets

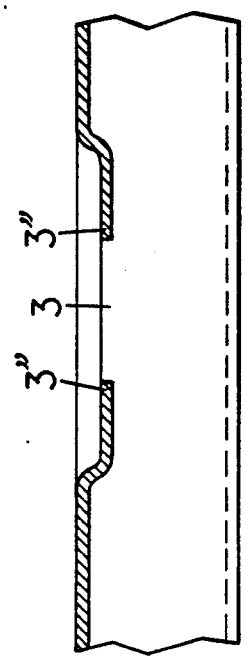
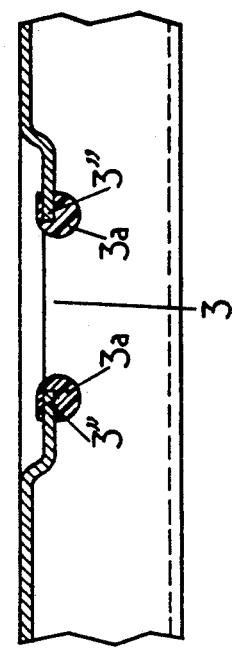
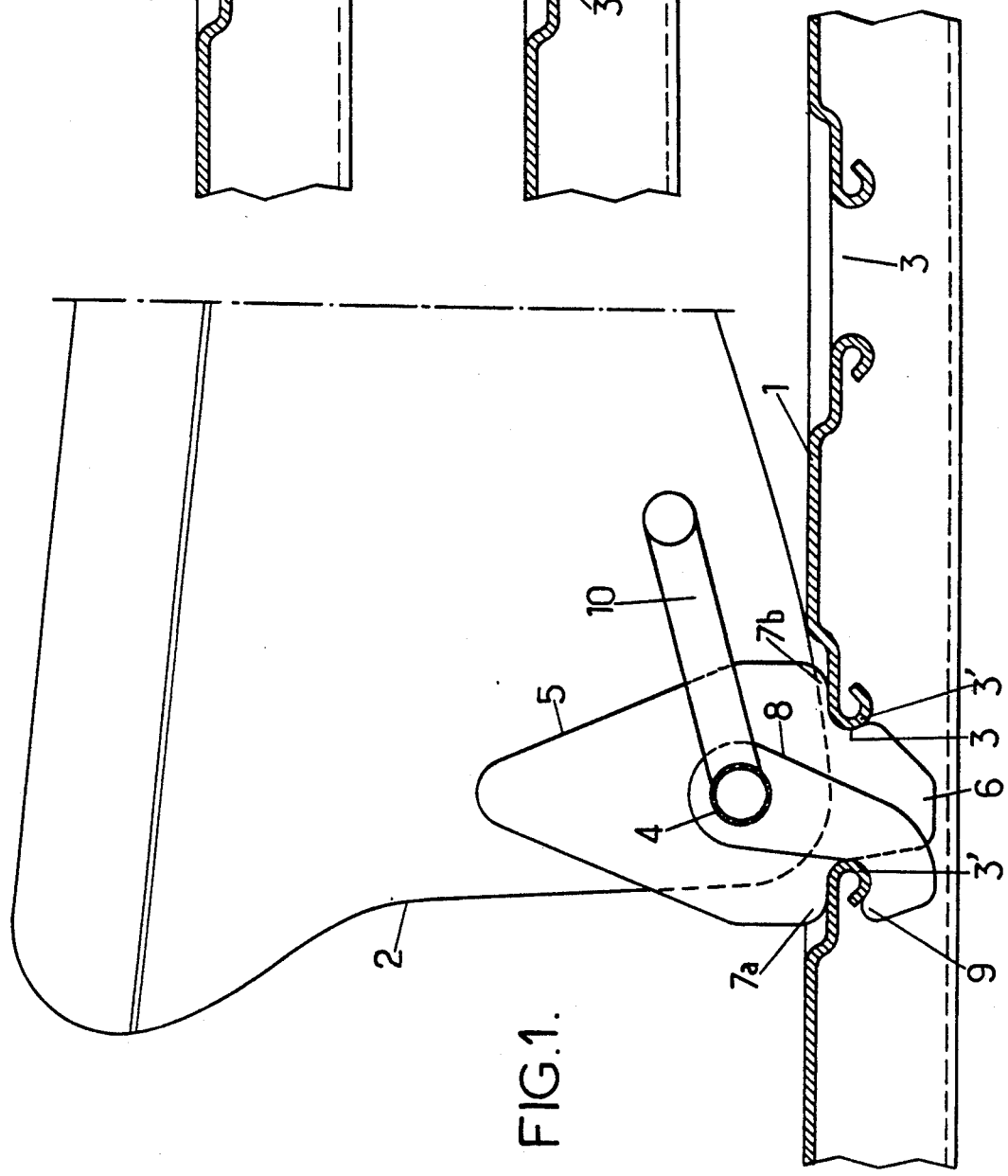

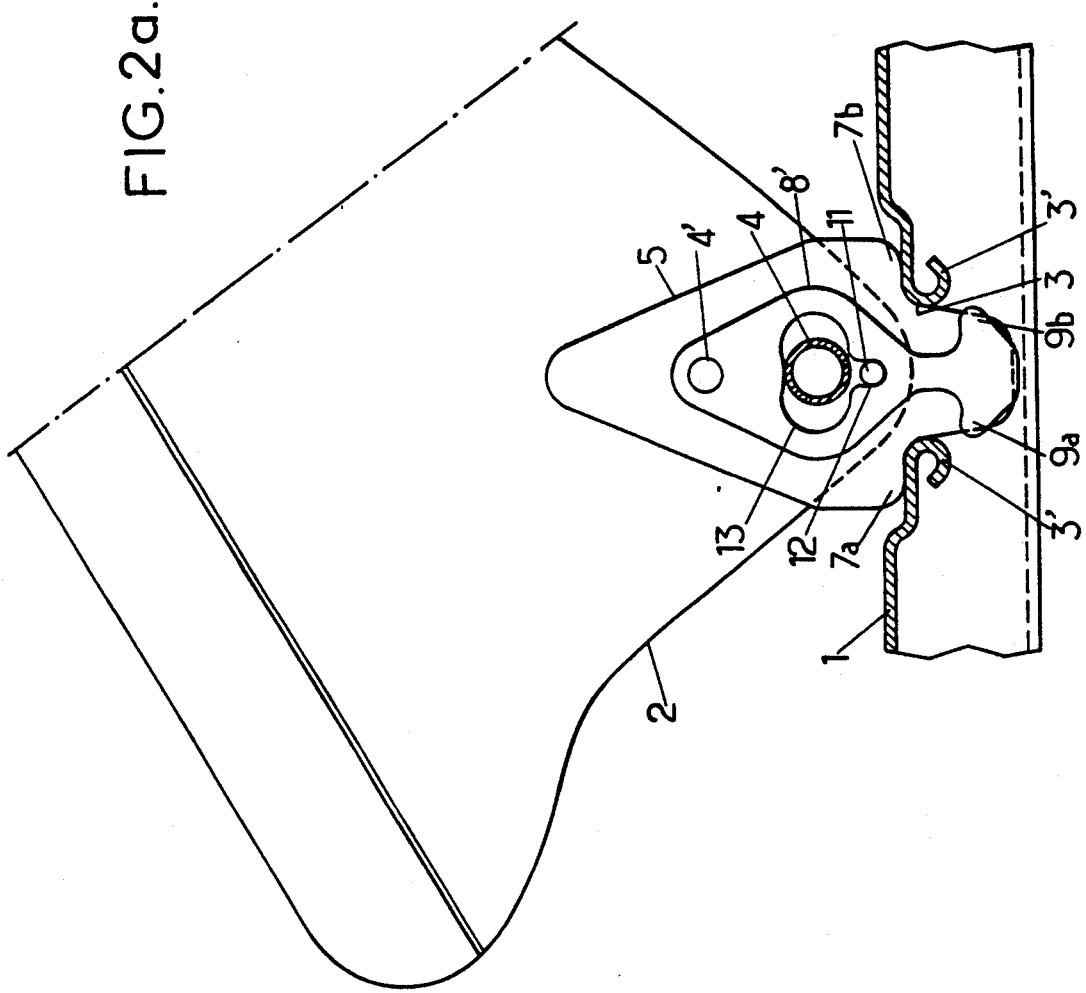

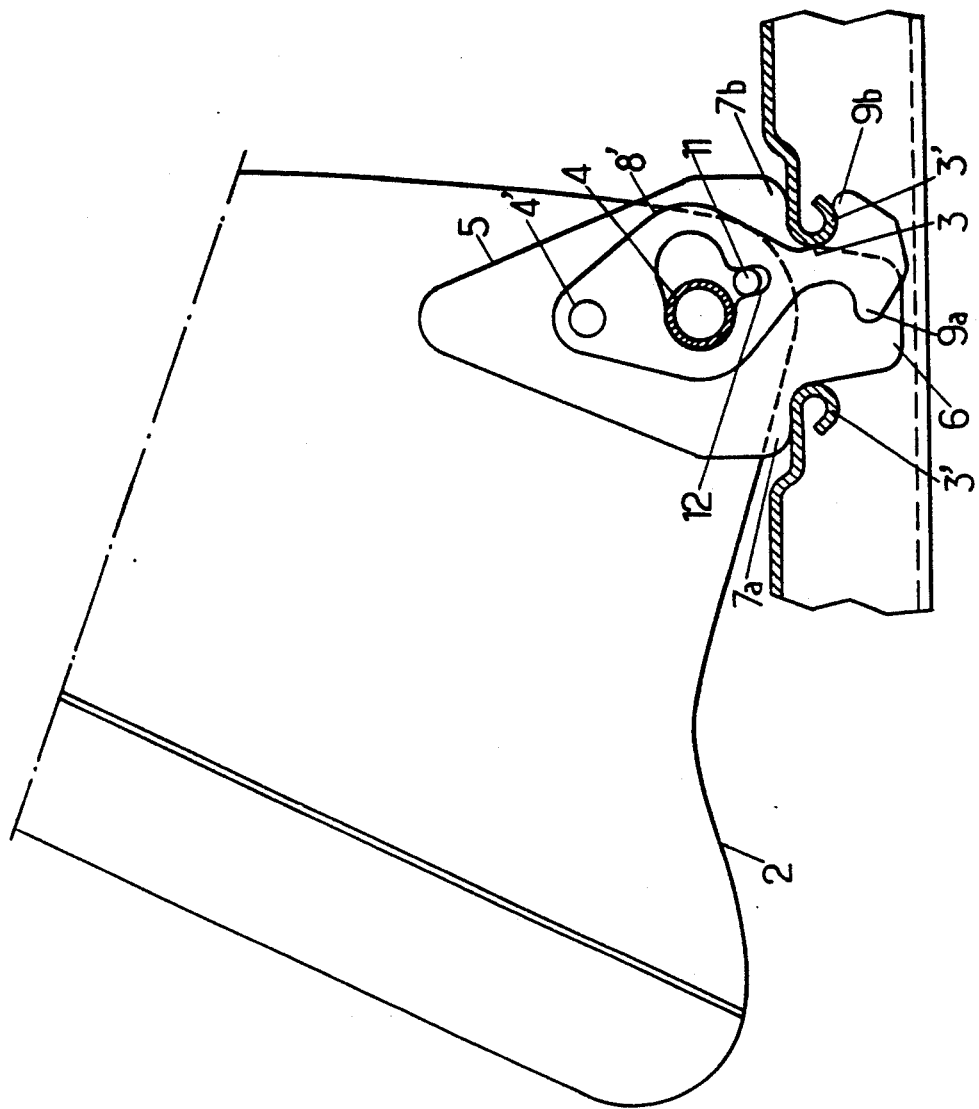

MOVABLE VEHICLE SEAT

The present invention relates to a movable seat for a vehicle, the seat being of the type comprising an unlockable fixing mechanism enabling the seat structure of the seat to be fixed to the floor of said vehicle and control means for said mechanism for the purpose of selectively moving it to a position suitable for locking said structure to said floor or to a position suitable for disconnecting it therefrom.

A fixing mechanism of this type must be capable of being operated without any tooling and may be provided at least at the back of the seat structure, e.g. at the ends of its back legs when it is desirable for the seat to be capable of being pivoted forwards, either to make more room or else in a two-door vehicle to allow a passenger to reach the back seats by tilting a front seat. Such a mechanism may be provided not only at the back of the seat structure, but also at the front thereof when it is desirable to be able to disconnect the seat completely from the floor of the vehicle, e.g. a back seat in a single-space vehicle.

In presently known mechanisms of this type, the corresponding legs of the seat structure are terminated by respective fork-shaped parts that are placed over catch rods fixed to the floor, where such rods form bridges between pairs of opposite edges of openings formed in the floor and of U-shaped cross-section. The latch enabling the leg to be secured to the floor or to be released therefrom is then constituted by a kind of hook pivotally mounted on said fork-shaped part and suitable for having its end penetrate into said opening and engage beneath the above-mentioned fixed rod, said hook being moved by appropriate means.

It is necessary, specifically, to install the catch rod and then weld or crimp it to the opposite edges of the U-shaped opening in the floor, and this complicates manufacture to a certain extent and is relatively expensive. It should also be observed that when it is desired that the horizontal position of the seat relative to the floor should be adjustable, as is often the case, a plurality of U-shaped openings should be provided in the floor of the vehicle for receiving each of the legs of the seat structure, with each of the openings being fitted with its own fixed rod.

In addition, it is generally necessary to provide a cover, e.g. made of plastic, to prevent mud and other dirt getting into the openings in the floor that are not in use, since otherwise, when the horizontal position of the seat is changed, the hook may be prevented from engaging beneath the corresponding rod. This further complicates the system and increases its cost.

The object of the present invention is to remedy all of these drawbacks of the prior art, and to this end, a movable vehicle seat of the type mentioned at the beginning is characterized, according to the invention, in that said mechanism comprises a latch having a shoulder and mounted to rotate relative to said seat structure and suitable for penetrating in an opening in said floor, said latch being capable of occupying, under the control of said control means, either an unlocking position in which it can penetrate into said opening or escape therefrom, or else a locking position after it has penetrated into said opening, in which position said shoulder is in locking engagement beyond an edge of said opening.

The invention thus makes it possible to eliminate the catch rod of the prior art, together with all of the drawbacks that stem therefrom. The function of the rod is now provided, with practically no complication in manufacture, by the above-specified edge of the opening in the floor. It may be constituted, for example, by a rolled sheet-metal edge, which makes it possible to obtain strength that is quite comparable to that of the prior art catch rod, but which is much simpler to manufacture. It would also be possible to provide for said edge to carry an anti-noise covering, which covering would also have the effect of mechanically protecting said edge of the opening in the floor.

According to another characteristic of the invention, said latch is mounted along a positioning and guide plate connected to said seat structure, said plate having a projection suitable for penetrating into said opening in the floor and an enlarged region on either side of said projection enabling said plate to stand on said floor; advantageously, said latch is pivotally mounted on said plate.

The invention may be implemented in several different ways.

For example, said control means are manual and comprise a lever suitable for controlling said latch directly, in a manner that is known per se.

The control means may also be automatic, particularly when said seat structure is connected to said plate by means of a pivot pin mounted thereon. Under such circumstances, it is convenient to provide control means suitable for rotating said latch between said locking position and said unlocking position when said seat structure is caused to pivot on said pivot pin.

The operation of such a mechanism would be seen more clearly below. It may also be characterized in that said automatic control means comprise a drive finger secured to said seat structure and disposed in the vicinity of said pivot pin, said finger being coupled to said latch and capable of being received in a notch of said latch. The particular advantage of this disposition is explained below.

According to yet another characteristic, the end of said pivot pin is received in an arcuate slot in said latch suitable for limiting pivoting thereof when the said seat structure is pivoted.

The fixing mechanism of a movable seat in accordance with the invention may also be characterized in that said latch includes two opposite shoulders suitable for taking up locking engagement beneath respective opposite edges of said opening in the floor.

The latch can thus lock onto either of the edges of an opening in the floor. For example, it may lock under the front edge during normal use of the seat. When the seat is pivoted forwards, the latch can thus pass through the above-mentioned unlocking position in which it can escape from the opening in the floor, but the forwards rotation of the seat may continue, if necessary, beyond said position since because of its second shoulder the latch can then engage behind the rear edge of the opening in question in the floor, thereby maintaining the desirable connection between the seat and the floor even after the seat has pivoted through an angle of large amplitude.

Embodiments of the invention are described by way of non-limiting example with reference to the figures of the accompanying drawings, in which:

FIG. 1 is an inside view of the seat fixing mechanism of the present invention having manual control means, and provided at the front of the seat, for example;

FIG. 2a shows the FIG. 2 mechanism in an intermediate unlocking position after the seat has been pivoted forwards;

FIG. 2b shows the FIG. 2 mechanism in a position where it is locked to the rear edge of the same opening in the floor, after the seat has been pivoted further in the forwards direction;

FIG. 3 shows an opening in the floor having bare edges that are merely cut out; and FIG. 4 shows an opening in the floor having edges that are cut out and covered.

Figure 2:
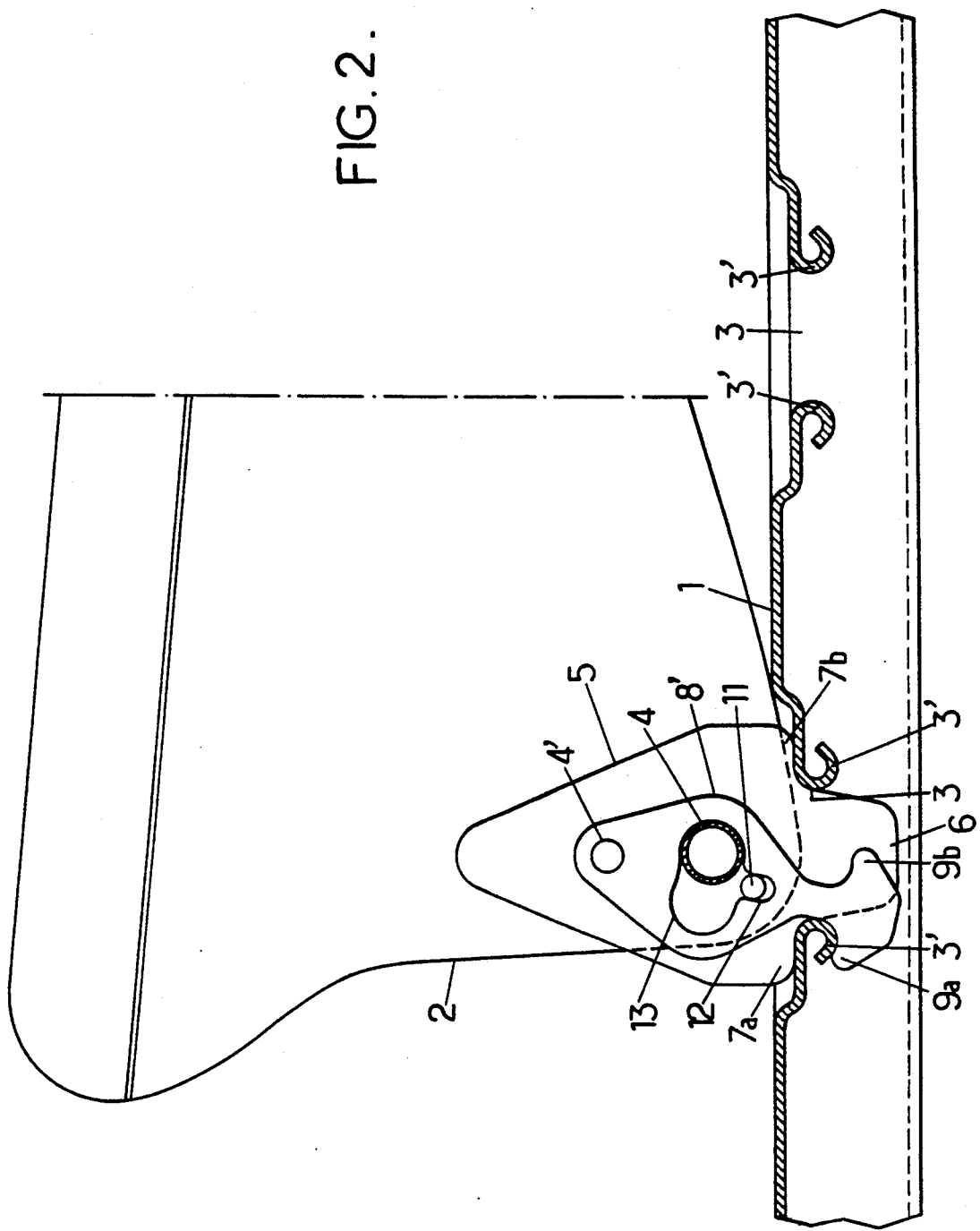
FIG. 2 shows the front of another embodiment of the mechanism of the invention having automatic control means, said mechanism being shown in its position where it is locked to the front edge of the opening in the floor.

In the figures, the floor of the vehicle is referenced 1, and the seat structure of the seat is referenced 2. The fixing mechanism is shown in FIGS. 1 and 2 as seen from inside the seat structure 2, and at the front thereof. Since the front of the seat faces left in the drawing, the mechanism shown is for the righthand side of the seat, but it will be understood that the fixing mechanism provided on the lefthand side of the seat would be similar and disposed symmetrically to that shown, so there is no need to describe it.

The floor 1 of the vehicle includes a series of elongate openings 3 for each side (i.e. left and right) of the seat structure 2, said openings being preferably uniformly spaced apart in the longitudinal direction of the vehicle, thereby enabling the seat to be positioned longitudinally in a desired location, e.g. to provide optimum control over the space available inside the vehicle. In FIGS. 1 and 2, the edges 3' of the openings 3 are rolled sheet metal edges, thereby ensuring that they are rigid and facilitating proper latching operation. Nevertheless, they could remain mere cutouts as shown at 3" in FIG. 3, but under such circumstances it is preferable for them to be given protective coverings as shown at 3a in FIG. 4, e.g. coverings made of plastic so as to prevent noise propagating, e.g. due to vibrations transmitted to the seats by the vehicle.

In the FIG. 1 embodiment, the seat structure 2 of the seat is pivotally mounted on a pin 4 carried by a guiding and positioning plate 5. The plate includes a projection 6 that penetrates without slack into the corresponding opening 3 in the floor 1 and has an enlarged area 7a, 7b that rests on the floor. A latch 8 having a shoulder 9 is pivotally mounted on the same pin 4 of the plate 5, the latch being secured to a manual control lever 10. In the position shown in FIG. 1, it can be seen that the shoulder 9 of the latch is secured beneath the rolled front edge 3' of the corresponding opening 3, thereby locking the plate 5 together with the front portion of the seat structure 2 on the floor 1 of the vehicle. The seat can nevertheless pivot about the axis 4, assuming that its rear portion is not locked to the floor 1.

To disconnect the front portion of the seat from the floor, it can be seen that it suffices to operate the lever 10 anticlockwise so as to pivot the latch in the same direction, thereby disengaging the shoulder 9 from the front rolled edge 3' and thus enabling it to be lifted out from the opening 3. The latch of the lefthand mechanism is pivoted simultaneously, e.g. by means of a crossbar interconnecting the two latches.

In the embodiment of FIGS. 2, 2a, and 2b, the relative disposition of the seat structure 2, the pivot pin 4, and the plate 5 is the same as in the embodiment of FIG. 1. The latch 8' now has two opposite shoulders 9a and 9b, and it is pivotally mounted on another pin 4' of the plate 5. A drive finger 11 secured to the seat structure 2 is received in a notch 12 of the latch 8', at a short distance from the pivot pin 4.

Finally, an arcuate slot 13 in the latch 8' receives the end of the pin 4, thereby enabling the pin to limit the angular displacement of the latch 8' when its end having the shoulders 9a and 9b is disengaged from the opening 3. The pivoting of the latch 8' is controlled automatically by pivoting the structure 2 about the pin 4.

In the position shown in FIG. 2, the seat is in its normal position and its front end is locked to the floor 1 by the front shoulder 9a engaging behind the corresponding rolled edge 3' of the opening 3.

If the structure 2 is pivoted on the pin 4, its finger 11 acts against the rear edge of the notch 12 and causes the latch 8' to pivot about the pin 4'. In an intermediate position as shown in FIG. 2a, the latch can be extracted from the opening 3 and the front portion of the seat can thus be disconnected from the floor 1 of the vehicle.

However, from this position, it is possible to continue pivoting the seat structure 2 on the pin 4 in the anticlockwise direction until the end position of FIG. 2b is reached, in which position the front of the seat is again locked to the floor 1, this time by the rear shoulder 9b of the latch ' engaging beneath the rear edge 3' of the opening 3.

Since the drive finger 11 of the latch is considerably closer to the pin 4 than to the pin 4', it can be seen that the effect of rotating the seat provides "gearing" in that a large amplitude rotation of the seat, e.g. about 80°, gives rise to a much smaller amplitude rotation of the latch 8', e.g. about 27°. This greatly limits the angular displacement of the latch 8', and thus the length that must be given to the openings 3.

Starting from the extreme position of FIG. 2b, it is naturally possible to tilt the seat back so that the finger 11 then drives the latch 8' in the opposite direction until the front shoulder 9a of the latch re-engages behind the front edge 3' of the opening 3, after passing through the intermediate unlocking position of FIG. 2a.

The fixing mechanism on the lefthand side of the seat is identical and it naturally operates in the same way, with its latch pivoting simultaneously.

I claim:

1. A combination of a vehicle having a floor, a seat with a seat structure and a fixing system for fixing the seat to the floor, said combination comprising:

an opening having an edge in the floor of the vehicle;

a fixing mechanism attached to the set structure which fixes the seat structure to the floor, said fixing mechanism including a latch having a distal portion provided with a shoulder which said distal portion penetrates said opening, a mounting means for mounting said latch for rotation relative to the set structure, a control means for selectively moving the distal portion of said latch in said opening between (a) an unlocking position where said shoulder is free to penetrate into or escape from said opening and (b) a locking position where, after penetration of said distal portion of said latch into said opening, said shoulder is underneath and in locking engagement with said edge of said opening, and a positioning and guide plate attached to the seat structure along side of which said latch is rotatably mounted, said plate including a distal projection which penetrates said opening when said distal portion of said latch penetrates said opening and an enlarged region on opposite sides of said distal projection which engages the flow when the projection penetrates said opening.

2. A combination as claimed in claim 1 wherein said edge of said opening is a rolled sheet metal edge.

3. A combination as claimed in claim 1 and further including an anti-noise covering carried on said edge of said opening.

4. A combination as claimed in claim 1 wherein said latch is pivotally mounted relative to said plate.

5. A combination as claimed in claim 4 wherein said control means comprises a lever attached to said latch which is manually moved to move said distal portion of said latch between the locking and unlocking positions.

6. A combination as claimed in claim 4 and further including a pivot pin mounted on said plate and to which said seat structure is attached so that said seat structure is rotationally mounted relative to said plate on said pivot pin; and wherein said control means includes an automatic means for rotating said distal portion of said latch between said locking and unlocking positions as said seat structure is rotated relative to said plate.

7. A combination as claimed in claim 6 wherein said automatic means comprises a drive finger attached to said seat structure adjacent said pivot pin and a coupling means for coupling said drive finger to said latch.

8. A combination as claimed in claim 7 wherein a distance of said drive finger to a pivot axis for said latch on said plate is considerably greater than a distance of said drive finger to said pivot pin.

9. A combination as claimed in claim 7 wherein said coupling means includes a notch in said latch in which said drive pin is received.

10. A combination as claimed in claim 9 wherein said latch includes an arcuate slot in which said pivot pin is received which said slot limits the rotation of said seat structure about said pivot pin.

11. A combination as claimed in claim 10 wherein said distal portion of said latch includes a second shoulder opposite said first-mentioned shoulder; and wherein said distal portion of said latch s moved by rotation of said set structure between a use position and a tilted position of said seat structure such that (a) the unlocking position of said distal portion of said latch is at an intermediate position of said seat structure between said use and tilted positions, (b) the locking position of said distal portion of said latch is at said sue position, and (c) at the tilted position of said seat structure, said second shoulder is underneath and in locking engagement with said edge of said opening.

* * * * *